Figure 1:
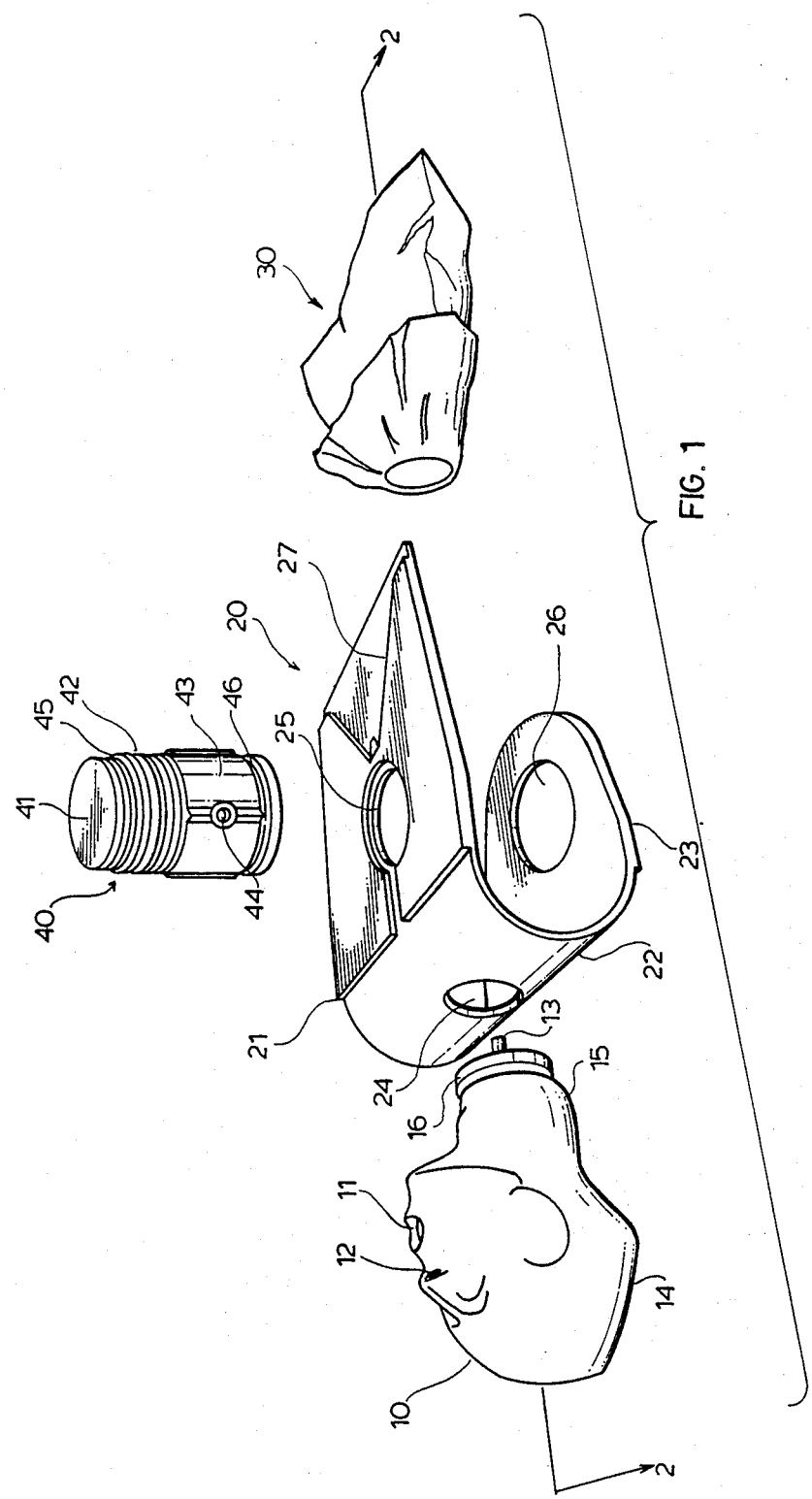

United States Patent [19]

Brault et al.

[11] Patent Number: 4,984,987
[45] Date of Patent: Jan. 15, 1991

[54] CPR MANIKIN

[75] Inventors: Richard Brault; Dianne Croteau, both of Toronto; Jonathan Vinden, Mississauga, all of Canada

[73] Assignee: Actar Airforce, Inc., Toronto, Canada

[21] Appl. No.: 433,904

[22] Filed: Nov. 9, 1989

[51] Int. Cl.$^5$ .............................................. G09B 23/28
[52] U.S. Cl. ................................... 434/265; 434/267; 434/270; 434/272; 128/28
[58] Field of Search ............... 434/265, 267, 268, 270, 434/272, 275; 128/28, 30.2

[56] References Cited

U.S. PATENT DOCUMENTS

| | | | |
|---|---|---|---|
| 3,562,925 | 2/1971 | Baermann et al. | 434/265 |
| 3,872,609 | 3/1975 | Smrcka | 434/265 |
| 3,994,075 | 11/1976 | Kohnke | 434/265 |
| 4,001,950 | 1/1977 | Blumensaadt | 434/265 |
| 4,801,268 | 1/1989 | Kohnke | 434/265 |
| 4,850,876 | 7/1989 | Lutaenko et al. | 434/265 |

FOREIGN PATENT DOCUMENTS

| | | | |
|---|---|---|---|
| 197706 | 10/1977 | U.S.S.R. | 434/265 |
| 934755 | 8/1963 | United Kingdom | 434/265 |

Primary Examiner—Richard J. Apley
Assistant Examiner—Jennifer L. Doyle

[57] ABSTRACT

A manikin with a disposable lung is used as a tool for teaching cardio-pulmonary resuscitation (CPR). The manikin includes a head, chest, disposable lung, and compression device. The head includes a "mouth" opening to receive air blown into it by a user, and the chest is removably connected to the head. The disposable lung is removably connected to the head in communication with the mouth opening. The compression device preferably is a resilient dowel like member which extends vertically through the manikin chest, having a stop which positively prevents resilient compression of more than a certain amount.

21 Claims, 4 Drawing Sheets

CPR MANIKIN

FIELD OF INVENTION

This invention relates to a manikin intended to be used as a tool for teaching cardio-pulmonary resuscitation (CPR) techniques including ventilation and/or external heart massage.

PRIOR ART

CPR instruction involves teaching both theory and techniques for application of the theory. Accordingly, students require a means on which to practise the techniques which are taught. Students can practise artificial breathing techniques on one another, but, often there is a reluctance to do this in a classroom environment because of the intimate nature of the mouth to mouth ventilation method and because of concerns about the transmission of disease. On the other hand, the techniques of external cardiac massage are too aggressive to be practised fully on other students. Consequently, there has been a demand for the manufacture of manikins which will enable students to practise both the ventilation and external heart massage techniques of CPR.

There are many complex and interrelated functions and structures of the human body that are pertinent to the application of both ventilation and cardiac massage resuscitation techniques. Some of the features that are sought to be obtained in a CPR manikin are; a hygienic system which will prevent the transmission of disease from one student to another, a moveable head to permit positioning for throat clearance, a realistic anatomy showing body features which serve as indicators or "landmarks" to locate points of administration, a moveable chest which visually demonstrates breathing during ventilation, a means for measuring and changing volume of air to simulate adults and children, a compressible chest cavity which provides realistic resistance.

Many different systems have been developed for manikins to reduce transmission of germs and viruses. Some manikins are adapted to be cleaned with cleaning solutions after each student uses the manikin. In other manikins, a removable face piece or mask is provided to fit onto the head to be exchanged for a clean one as each student takes a turn. Some manikins have disposable lower airways or lungs to be replaced in the manikin after each student.

The other structural and functional features desired in a manikin are obtained in varying degrees by different manufacturers. Some take pains to replicate the human features even to the extent of attempting to duplicate the texture and feel of human skin. Various types of internal plumbing are used to simulate the airways of the body and sometimes electronics are incorporated into the manikin to produce electrical signals or computer displays relevant to the administration of the techniques. Some manufacturers have patented some manikins or devices for practising ventilation techniques. The applicant is aware of U.S. Pat. Nos. 2,904,898 and 3,068,590, French patent No. 1,207,372 and Australian Patent No. 270,640. However, these devices do not provide a means for practising the full CPR techniques. Others have developed manikins to provide both ventilation and external massage, but, it seems to the applicants that the trend in the manufacture of CPR manikins has been towards technical sophistication which in turn has led to the development of expensive manikins. The basic CPR manikins that are known to the applicants cost hundreds of dollars, others cost more than a thousand dollars.

No doubt the sophistication of the CPR manikin technology is useful to instruction of some students, perhaps in cases where advanced courses are being taken. It is the perception of the applicants, however, that there is a public interest in providing basic CPR training to many people since it is usually applied in an emergency situation where it may not be practical to wait until a CPR expert arrives at the scene. It is believed that simple techniques can be effective and that the more people that know the techniques the more likely that there will be someone available to assist an emergency victim. Regular and frequent practise is seen by the applicants to be an important feature of any CPR instruction program and to retention of the skills learned. Applicants believe therefore that it may be disadvantageous to have only expensive manikins available for teaching programs aimed at providing basic skills to many people. It will be appreciated that most instructors would not be able to afford more than 1 or 2 of these expensive manikins for each class. Therefore students must take turns on the manikin. There is less opportunity to practise and teaching is time inefficient where students are waiting to practise. While there may be some benefit in watching others practise it is the applicants' view that it would be more beneficial to instruction and more efficient to have all students practise together as a class on separate manikins. Moreover, if manikins were inexpensive students might obtain a manikin for practise at home to retain their skills after completion of the course.

It is also believed that there is a need for a readily portable manikin to enable an instructor to travel from one location to another to provide instruction. Prior art manikins are believed to be large and cumbersome for a single instructor to transport conveniently in large numbers. Applicants believe that an instructor should be able to carry many manikins in a hand held or over the shoulder carrying case.

OBJECT OF THIS INVENTION

It is an object of this invention to provide an inexpensive, readily portable manikin which will serve as a teaching tool for a basic CPR instruction course.

STATEMENT OF THE INVENTION

The present invention is a manikin comprising in combination a head means, a chest means, a disposable lung means, and a compression means in which;
- the head means has an opening to receive air blown into it by a user,
- the chest means is adapted to be removably connected to the head means,
- the disposable lung means is adapted to be removably connected to the head means within the chest means, in communication with the opening of the head means,
- the compression means is adapted to fit within the chest means to receive compression administered by a user.

The head means of this invention is preferably a hollow head which will avail itself to mass production techniques. It will be obvious to those skilled in the art that there are many materials and production methods that will be suitable for manufacture of the head. The head may be formed with a mouth opening and in some embodiments, with nostril openings. The head preferably will have a neck portion which is adapted to be connected to the disposable lung portion and to connect to the chest means. It will be appreciated that there are many ways of connecting these pieces but it is preferred that the head means be held in a flexible connection to permit it to be tilted back to the position recommended for ventilation techniques.

The chest means is a simple shell to provide a visual impression of a torso and may have anatomical indicators or reference points to assist one to locate the correct position for hand placement during application of the compression massage techniques. It is preferred that the chest means be flexible in at least the upper portion to allow it to move during simulated ventilation and external heart massage. It will be obvious upon reading this specification that many different materials and manufacturing methods would be suitable for the fabrication of a chest means, however, it is preferred that the chest means be made from a flexible, flat sheet which may be folded over upon itself to form the back and front. The head means can then be connected at the fold. An opening cut in the sheet may be adapted to fit over the neck of the head means. The front and back portions are separated by the resilient compression means. Again openings may be cut in the flat sheet to fit about the compression means. A flexible, plastic foam sheet is preferred because it is light, inexpensive and durable; convenient for packing and storage when disassembled and presents a simple medium for manufacture of this element.

The disposable lung means may be a simple plastic bag. It may be fastened to the neck of the head means by any of a number of conventional means. Consistent with the low cost object of this invention it is preferred that the bag be fastened to the neck with a conventional elastic band. A groove may be provided in the neck means to locate the elastic band. By adjusting the position of the elastic over the length of the bag one can fasten the bag to the neck to obtain different bag volumes in communication with the head. Accordingly, one can very simply simulate the lung capacity of an adult or a child.

The compression means is adapted to be fitted within the chest means at a predetermined location where external massage would be given. It is further adapted to be compressed by a user attempting to practise external heart massage and to resiliently restore itself as the compression is removed. It will be appreciated that it could be manufactured in many ways with different materials. Different structures for the compression means that have been considered by the applicants include a compressible foam, a hydraulic or pneumatic piston, a spring and an "accordion" folded flexible member. It is preferred that it take the form of a cylinder which is sufficiently resilient to provide resistance to deformation under a force of compression and substantially to return to its undeformed state when the force of compression is removed. The resistance should resemble the kind of resistance a human body would provide. In some preferred embodiments the cylinder will be hollow and adapted, upon disassembly, to fit about the neck of the head means to reduce the volume of the manikin parts during storage.

In operation, the head means is fitted into the chest means, the disposable lung bag is fastened to the neck of the head means within the chest means and the compression means is fastened within the chest means. The user then places the assembled manikin on a floor or other surface where the practise is take place. Ventilation techniques may be practised by tilting the head, lifting the chin, pinching the nostrils shut and blowing air into the mouth opening of the head. The air fills the bag and pushes outwardly on the chest means allowing a visual indication of the chest filling with air. External heart massage techniques may be practised by pressing on the compression means repeatedly in the manner taught by a qualified instructor.

Figure 2:
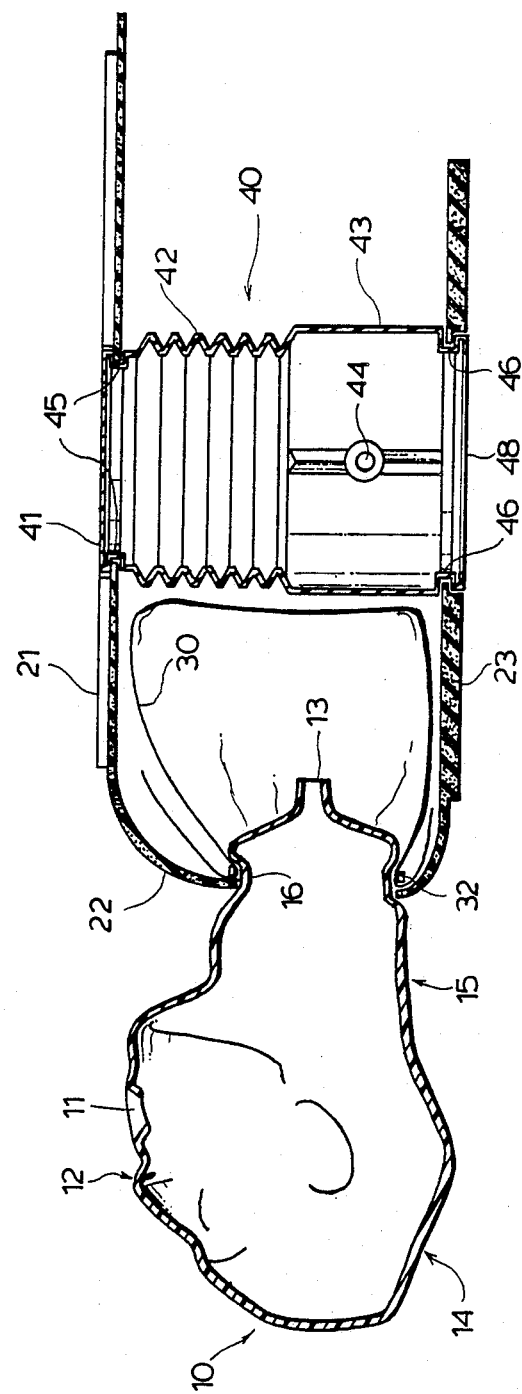
Figure 4:
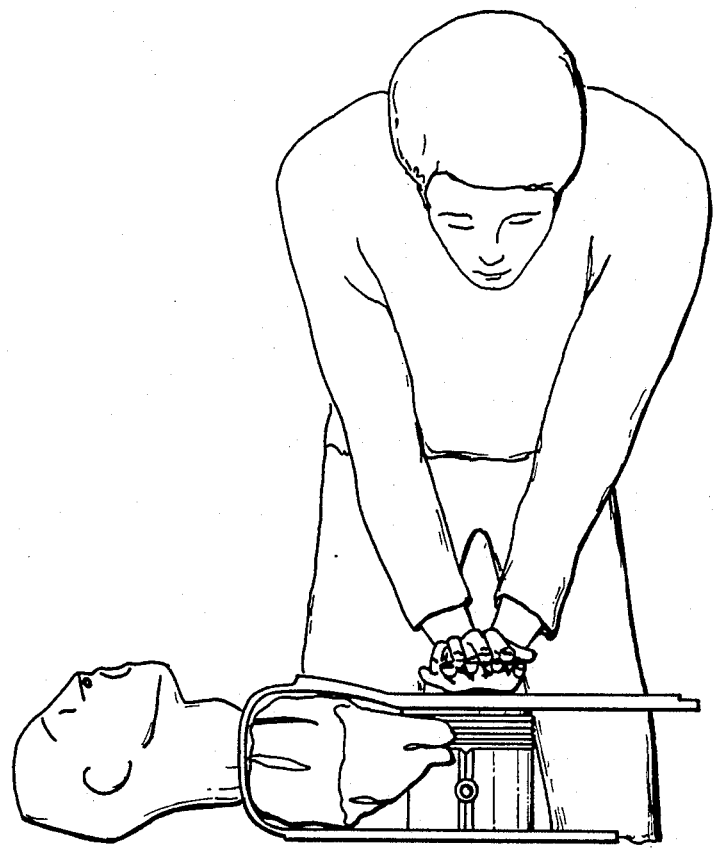
Figure 3:
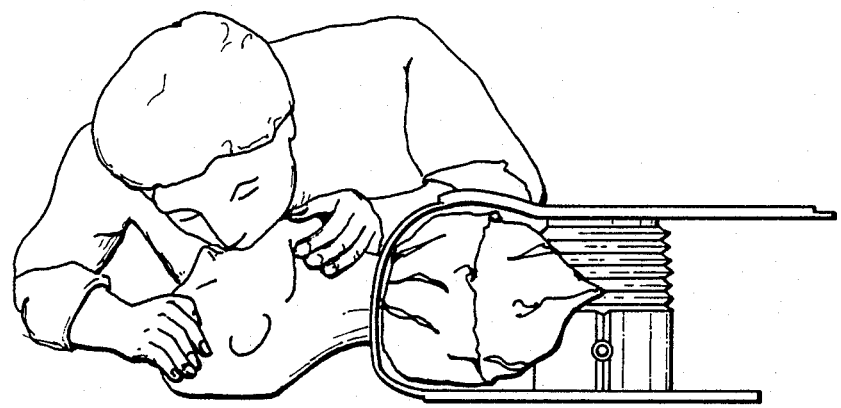
Figure 5:
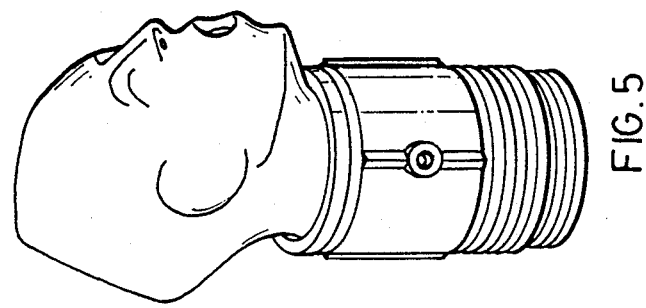
Figure 6:
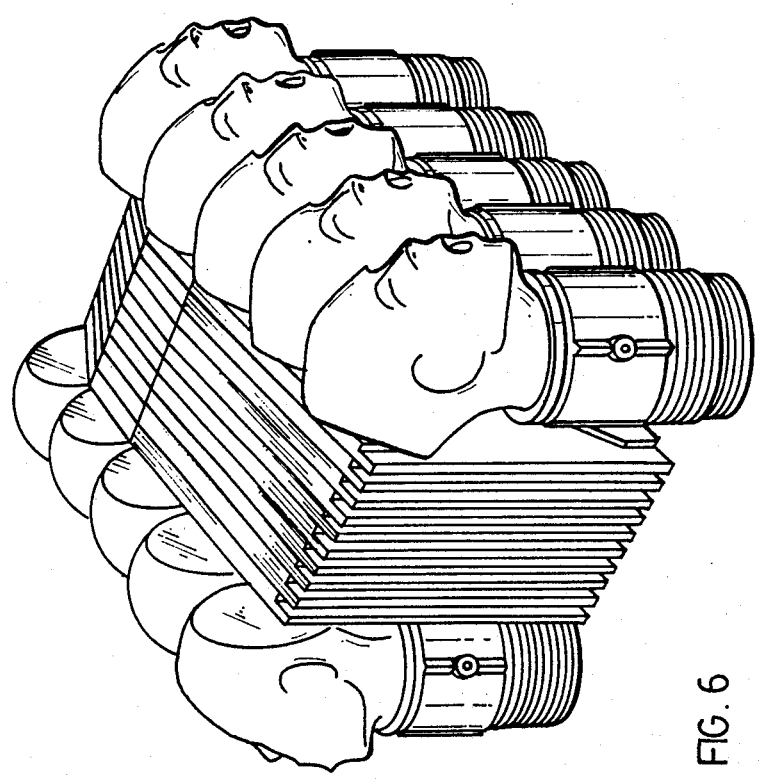

In the figures that illustrate the preferred embodiment of this invention;

FIG. 1 is an exploded view of the components of the preferred embodiment of this invention, FIG. 2 is a side sectional view illustrating the assembled manikin, FIG. 3 is a side view of the manikin as it is being used for practise of ventilation techniques, FIG. 4 is a side view of the manikin as it is being used for practise of external heart massage techniques, FIG. 5 illustrates the neck of the head means fitted into the compression means for storage, FIG. 6 illustrates how a number of the manikins can be stored for packing and transportation.

In the figures that illustrate the preferred embodiment of this invention like numerals indicate like elements.

The arrangement of the components may be described with the assistance of FIG. 1.

The head means (10) is a blow moulded hollow plastic shell which has general approximations of the shape and features of a human head. Openings are provided for the mouth (11), the nostrils (12) and the throat (13). The back portion of the head has a seat (14) which is flattened so that it will lie flat against the floor when the head is tilted back to provide an indicator for the procedure used for opening the victim's throat. The head has a neck (15) in which there is a fitting groove (16).

The chest means (20) is an integral cross-linked polyethylene closed cell foam sheet die cut in the general shape of a chest front plate (21), a shoulder portion (22) and a back plate (23). The chest cavity is formed by bending the chest means (20) over upon itself so that the back plate (23) lies against the floor and the front plate (21) overlies it. The foam material will have resistance to folding which will tend to separate the front plate (21) and the back plate (23) near the shoulder portion (22). A neck opening (24) is cut centrally in the shoulder portion (22). A front plate opening (25) and a rear plate opening (26) are provided to fit about the compression means (40). The compression means (40) provides a further structural member to secure and to separate the front plate (21) and the back plate (23). The front plate (21) is also impressed with a lower rib indicator (27) which may be used in an exercise to locate the correct hand position. The disposable lung means is a plastic bag (30). An elastic band (32) [not shown in FIG. 1 - see FIG. 2] is looped about the bag (30) at a location appropriate to the volume of the lung capacity of the imaginary victim. The bag (30) is marked with dotted lines (not shown) or the like for location of the elastic band (32) to simulate the lung volumes of different types of possible victims.

The compression means (40) is a hollow, cylindrical, blow-moulded thermoplastic elastomer having an internal diameter slightly larger than the outside diameter of the neck (15). It has a top plate (41) adapted to receive a hand administered compressive force. The top portion of the side walls of the compressive means (40) comprises a bellows (42) adapted to deform and reform resiliently under the influence of compressive forces applied to plate (41). The lower part of the side walls comprises a stop (43) not deformable under ordinary compressive loads expected to be administered during practise sessions. The stop (43) presents a tactile indicator to the student that compression has reached an acceptable limit. Exhaust ports (44) are provided to allow air to escape from the compressive means (40) or to re-enter during deformation and reformation. A top fitting groove (45) and a lower fitting groove (46) are provided to fasten the compression means (40) within the chest means (20) to the front plate (21) and the back plate (23) respectively. The bottom (48) [See FIG. 2] of the compression means (40) is open.

The assembled manikin is shown in FIG. 2. The elastic band (32) is fitted at an appropriate location over bag (30) and to top of the bag (30) is flapped over the elastic band (32) as shown in FIG. 1. Next, the fitting groove (16) in the neck (15) receives the shoulder opening (24) of the chest means (20) and then the preassembled bag (30) and elastic band (32) of the disposable lung means (30) in an elastic press fit connection. The compression means (40) is fitted to front plate (21) and the back plate (23) in fitting grooves (45) and (46) respectively. The manikin in now ready for use.

In operation the head (10) is tilted back so that seat (14) is flat on the floor then ventilation drills may be practised by pinching the nose and blowing air into the mouth (11) (see FIG. 3). The air enters the head (10) and expels air through throat (13) into bag (30) to fill the chest cavity and press the front plate (21) upward to visually indicate the lung expansion. When blowing stops air expels from bag (30) into the head (10) and through the mouth (11). The drill may then be repeated. External heart massage practise may be done by using the lower rib indicator (27) to locate the correct hand position (which is also the location of the plate (41) of the compression means), then compression heart massage techniques may be practised using the compression means (See FIG. 4).

After use a manikin may be disassembled for convenient storage or transport. The lung bags (30) may be thrown in the garbage. The inside of the head (10) may be washed out with an appropriate cleaning solution. The heads may be drip dried by inserting them in the inverted compression means (40) as shown in FIG. 5 and standing them out to dry. The disassembled manikins may be stored as shown in FIG. 6 by laying the chest plate means (20) sheets adjacent one another and grouping the heads (10) and the compression means (40) about them. This is a convenient arrangement for packing in a case for transport. It will be appreciated that other arrangements may be used for different storage containers.

It will be appreciated by those skilled in the art that one or more of the component elements of this invention may be varied or permanently joined to other components without departing from the scope of this invention.

The embodiments of this invention in which an exclusive property and privilege is claimed are as follows:

1. A CPR manikin comprising in combination:
    a head means having a mouth opening and a throat means in communication with the mouth opening;
    a disposable lung means adapted to be fastened over and to be in communication with the throat means;
    a chest means including a sheet of flexible material forming a front plate having a thickness much less than its width and length;
    a resilient compression means fastened to and under the front plate of said chest means, to provide a biasing force on said front plate; and
    means defining an opening in said front plate extending through said front plate, said resilient compression means having a portion thereof disposed in said opening.

2. A manikin as recited in claim 1 wherein said front plate is generally horizontal during use, and wherein said lung means is horizontally spaced from said compression means, neither overlying nor underlying said compression means.

3. A manikin as recited in claim 1 wherein said front plate is generally horizontal during use, and wherein said lung means is horizontally spaced from said compression means, neither overlying nor underlying said compression means.

4. A manikin as recited in claim 3 wherein said resilient compression means comprises a hollow member having a bellows portion adapted to resiliently deform and reform under the application and release of a compressive load, and having a rigid wall stop portion providing a tactile indicator that compression has reached an acceptable limit.

5. A manikin as recited in claim 1 wherein said resilient compression means has a fastening groove near its top which is received in and fastened within said opening in said front plate.

6. A manikin as recited in claim 5 wherein said chest means further comprises a back plate having a thickness much less than its width and length, and means defining an opening in said back plate in vertical alignment with said opening in said front plate; and wherein said resilient compression means includes a fastening groove received within and fastened within the opening in said back plate.

7. A manikin as recited in claim 1 wherein said chest means further comprises a back plate having a thickness much less than its width and length, and means defining an opening in said back plate in vertical alignment with said opening in said front plate.

8. A manikin as recited in claim 7 further comprising a curved shoulder plate connecting said front plate and said back plate.

9. The manikin of claim 1 in which the head means has a flat portion near the crown of the head means adapted to seat the head means when held in a backward tilt during ventilation exercises while the chest means is adapted resiliently to resist such backward tilt.

10. The manikin of claim 1 in which the compression means is a member having a portion adapted to resiliently deform and reform under the application and release of a compressive load and further having a stop portion adapted to resist deformation under compressive loads usually experienced during CPR exercises.

11. A CPR manikin comprising in combination:
    a hollow head means having a mouth opening, a neck portion having a fitting groove for connection with a chest means and a disposable lung means and a throat opening at the bottom of the neck portion, said head means having a flat portion near the crown of the head adapted to seat the head when held in a backward tilt during ventilation exercises;

a chest means including a sheet of flexible material bent over upon itself to form a front plate, a shoulder portion and a back plate, said front plate including indicator means adapted to show the location of the lower rib and an opening to receive a top portion of a compression means; said shoulder means having an opening adapted to receive the neck portion of the head means and to fit into the fitting groove of the neck, said shoulder means being further adapted resiliently to resist a backward tilt of the head means; said back plate having an opening to receive a bottom portion of a compression means;

a disposable lung bag adapted to be fastened over the neck portion of the head means and adapted to be in communication through the throat opening with the hollow head means, said bag being adapted to exert a deforming force on the front plate of the chest means as it is filled with air;

a resilient compression means being adapted with fastening grooves near its top and bottom to be fastened into openings in the front plate and the back plate of said chest means, said compression means being a hollow member having a bellows portion adapted to resiliently deform and reform under the application and release of a compressive load and further having a rigid wall stop portion adapted to resist deformation under compressive loads usually experienced during CPR exercises.

12. A CPR manikin comprising in combination:
a hollow head means having a mouth opening, a neck portion and a throat opening at the bottom of the neck portion;
a disposable lung bag adapted to be fastened over the neck portion and to be in communication through the throat opening with the hollow head means;
a chest means including a sheet of flexible material bent over upon itself to form a front plate, a curved shoulder plate and a back plate, the volume between the plates being hollow; and
a resilient compression means being adapted to be fastened between the front plate and the back plate of said chest means, in the hollow volume therebetween, to provide a biasing force biasing the front and back plates apart, the resilient compression means engaging said front and back plates; said lung means also disposed in said hollow volume spaced from said resilient compression means.

13. A manikin as recited in claim 12 wherein said hollow head means is disposed within an opening in said curved shoulder plate.

14. A manikin as recited in claim 12 further comprising means defining an opening in each of said back and front plates, said openings being vertically aligned with each other; and wherein said resilient compression means comprises fastening grooves adjacent the top and bottom for fastening into said openings in said front and back plate.

15. A manikin as recited in claim 14 wherein said resilient compression means comprises a hollow member having a bellows portion adapted to resiliently deform and reform under the application and release of a compressive load, and having a rigid wall stop portion providing a tactile indicator that compression has reached an acceptable limit.

16. A manikin as recited in claim 12 wherein said resilient compression means comprises a hollow member having a bellows portion adapted to resiliently deform and reform under the application and release of a compressive load, and having a rigid wall stop portion providing a tactile indicator that compression has reached an acceptable limit.

17. The manikin of claim 12 in which the head means has a flat portion near the crown of the head means adapted to seat the head means when held in a backward tilt during ventilation exercises.

18. The manikin of claim 1 in which the chest means includes indicator means adapted to show the location of the lower rib.

19. The manikin of claim 12 in which the compression means is a resilient dowel-like member which extends vertically through the chest means.

20. A CPR manikin comprising in combination:
a head means having a mouth opening and a throat means in communication with the mouth opening;
a disposable lung means adapted to be fastened over and to be in communication with the throat means;
a chest means including a sheet of flexible material forming a front plate having a thickness much less than its width and length;
a resilient compression means fastened to and under the front plate of said chest means, to provide a biasing force on said front plate; and
wherein said front plate is generally horizontal during use, and wherein said lung means is horizontally spaced from said compression means, neither overlying nor underlying said compression means.

21. A CPR manikin comprising in combination:
a head means having a mouth opening and a throat means in communication with the mouth opening;
a disposable lung means adapted to be fastened over and to be in communication with the throat means;
a chest means including a sheet of flexible material forming a front plate having a thickness much less than its width and length;
a resilient compression means fastened to and under the front plate of said chest means, to provide a biasing force on said front plate; and
wherein said resilient compression means comprises a hollow member having a bellows portion adapted to resiliently deform and reform under the application and release of a compressive load, and having a rigid wall stop portion providing a tactile indicator that compression has reached an acceptable limit.

* * * * *